United States Patent
Sardesai

(10) Patent No.: US 7,292,790 B1
(45) Date of Patent: Nov. 6, 2007

(54) METHOD AND SYSTEM FOR COMPENSATING RESIDUAL DISPERSION CURVATURE

(75) Inventor: Harshad P. Sardesai, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 1035 days.

(21) Appl. No.: 10/216,113

(22) Filed: Aug. 9, 2002

Related U.S. Application Data

(63) Continuation-in-part of application No. 09/844,830, filed on Apr. 27, 2001, now abandoned, and a continuation-in-part of application No. 09/844,826, filed on Apr. 27, 2001, now abandoned.

(51) Int. Cl.
*H04B 10/00* (2006.01)
(52) U.S. Cl. .................. 398/148; 398/159; 398/147
(58) Field of Classification Search ........ 398/147–150, 398/158–161; 385/123
See application file for complete search history.

(56) References Cited

U.S. PATENT DOCUMENTS

| | | | |
|---|---|---|---|
| 5,956,440 A | 9/1999 | Mikami et al. | 385/24 |
| 6,188,823 B1 | 2/2001 | Ma | 385/123 |
| 6,307,985 B1 * | 10/2001 | Murakami et al. | 385/24 |
| 6,339,665 B1 * | 1/2002 | Danziger | 385/123 |
| 6,366,728 B1 * | 4/2002 | Way et al. | 385/123 |
| 6,384,943 B2 | 5/2002 | Ishikawa et al. | 359/124 |
| 6,404,952 B1 | 6/2002 | Danziger | 385/28 |

* cited by examiner

*Primary Examiner*—Augustin Bello
(74) *Attorney, Agent, or Firm*—Merek, Blackmon & Voorhees, LLC

(57) ABSTRACT

A method and system for compensating residual dispersion curvature in an optical communication network is disclosed. One embodiment employs two types of dispersion compensating fiber to reduce higher order terms in a residual dispersion profile. The two types of dispersion compensating fiber may be co-located in a dispersion compensation module positioned in each transmission fiber link. Alternatively, the two types of dispersion compensating fiber may be distributed across a span of the optical communication network.

17 Claims, 12 Drawing Sheets

METHOD AND SYSTEM FOR COMPENSATING RESIDUAL DISPERSION CURVATURE

CROSS-REFERENCE TO RELATED APPLICATIONS

This application is a continuation-in-part of both U.S. patent application Ser. No. 09/844,830 filed Apr. 27, 2001 now abandoned and U.S. patent application Ser. No. 09/844,826, filed Apr. 27, 2001, now abandoned the entire contents of which are incorporated herein by reference.

BACKGROUND OF THE INVENTION

1. Field of Invention

This invention relates to a method and system for compensating for residual dispersion curvature.

2. Description of Related Art

Dispersion is a known phenomenon in optical communication networks that causes a broadening of input pulses traveling along the length of the fiber. One type of dispersion relevant to the invention is chromatic dispersion (also referred to as "material dispersion" or "intramodal dispersion"), caused by a differential delay of various wavelengths of light in a waveguide material.

Dispersion has a limiting effect on the ability to transmit high data rates. When modulated onto an optical carrier, an optical spectrum is broadened in linear proportion to the bit rate. The interaction of the broadened optical spectrum with wavelength-dependent group velocity (i.e., dispersion) in the fiber introduces signal distortions. The amount of tolerable distortion is inversely proportional to the square of the bit rate. Thus, the combination of increasing spectral broadening and decreasing distortion tolerance makes the overall propagation penalty proportional to the square of bit rate.

This results, for example, in a 10 Gbps signal being 16 times less tolerant to dispersion than 2.5 Gbps signal, while having only 4 times the bit rate. Dispersion accumulates linearly with propagation distance in the fiber and typical propagation distances in standard single-mode fiber (e.g., SMF-28 or equivalent) are ~1000 km at 2.5 Gbps, 60 km at 10 Gbps, and only ~4 km at 40 Gbps. Clearly, some form of dispersion compensation is required to obtain meaningful propagation distances at bit rates of 10 Gbps and above.

Fiber-optic system transport capacity has been increasing through combining multiple, separately modulated optical carriers at distinct wavelengths onto a single fiber. This technique is known as wavelength-division multiplexing (WDM). Due to WDM, it is preferable that dispersion compensation be performed for multiple wavelengths using a common device.

Several methods have been proposed to compensate for dispersion, including fiber Bragg gratings, optical all-pass interference filters and dispersion compensating fiber. Dispersion compensating fiber (DCF) has found widespread practical acceptance and deployment due to numerous advantages. Such advantages include relatively low loss and cost and the ability to simultaneously compensate channels across multiple wavelengths without requiring spatial separation. Further, DCF has the ability to compensate for the unavoidable variation in the dispersion as a function of wavelength (second-order dispersion or dispersion slope) that exists in many current transport fibers.

To compensate for positive dispersion in a transmission fiber, conventional systems use lengths of DCF that have a negative dispersion coefficient. The length of DCF is selected so that the negative dispersion produced by the DCF counteracts the positive dispersion in the transmission fiber. While DCF provides adequate levels of dispersion compensation, it is difficult to produce DCF that also simultaneously compensates the dispersion slope. As transmission lengths between regeneration points increase and data rates increase, the need to compensate dispersion slope is paramount. Uncompensated dispersion slope results in system penalty and can significantly shorten transmission distances and/or channel counts. Ideally, upon reception each channel should have the same amount of net dispersion so that the net dispersion slope is zero.

Some types of DCF provide a high level of dispersion slope compensation. Unfortunately, this high level of dispersion slope compensation can introduce residual dispersion curvature. FIG. 1 is a graph of dispersion versus wavelength for a transmission fiber (referenced as E-LEAF), a first type of DCF (referenced as Type II DCF) and a second type of DCF (referenced as Type III DCF). The dispersion profile for the second type of DCF has a steeper slope and thus can provide a higher degree of dispersion slope compensation. Such transmission fibers and dispersion compensating fibers are manufactured by suppliers such as Corning, Lucent, and OFS-Fitel. In particular, the E-LEAF fiber described above is a popular transmission fiber manufactured by Corning.

FIG. 2 is a graph of residual dispersion versus wavelength for the two types of DCF referenced in FIG. 1. The graph shows the remaining dispersion levels after each type of DCF is used to compensate the 75 km of transmission fiber. As is evident, the residual dispersion after using the first type of DCF (referenced as Type II DCF) is linear, but the level of dispersion is significant, particularly in higher wavelengths. This high residual dispersion is problematic for high wavelengths in the C-band (1520 nm-1568 nm) and L-band (1568 nm-1610 nm).

The residual dispersion after using the second type of DCF (referred to as Type III DCF) has a lower magnitude across the wavelength range, but exhibits quadratic profile with respect to wavelength. Although the effect of residual dispersion and its curvature may not seem large in FIG. 2, the effect is additive when spans are concatenated. FIG. 3 is a graph of residual dispersion versus wavelength for transmissions over multiple, concatenated spans.

As evident from FIG. 3, as the number of spans increases, the quadratic nature of the residual dispersion increases. This gives rise to "dispersion shaping" or the reduction in effective transmission bandwidth since channels located at both the short and long wavelengths experience substantial amounts of uncompensated dispersion, relative to channels in the center. Although the channels near 1550 nm are well compensated, the curve can be linearly translated such that the zero dispersion point may be made to correspond with either the short or long wavelengths. The shape of the residual dispersion curve, however, does not change thereby reducing the effective bandwidth.

BRIEF DESCRIPTION OF THE DRAWINGS

Embodiments of the invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 4:
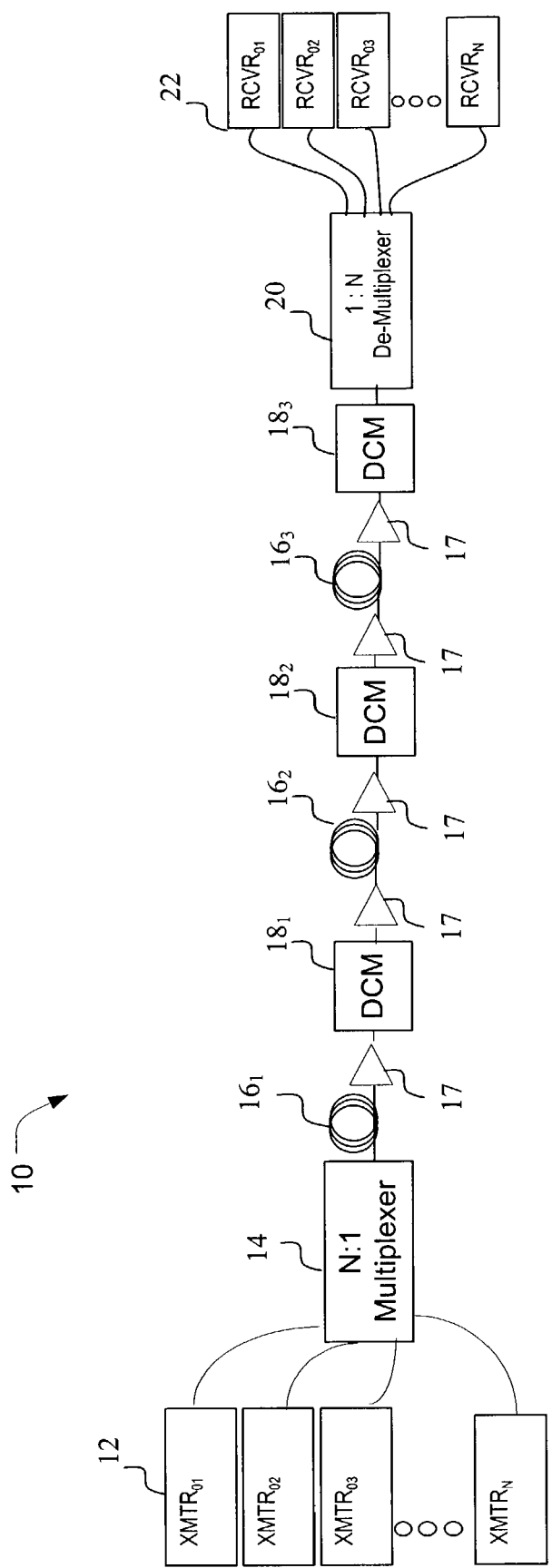
FIG. 4 is a block diagram of a span of an exemplary optical communication network.

FIG. 4 depicts one span 10 of an optical communication network in an exemplary embodiment of the invention. The span 10 includes a number of transmitters 12, each generating data on a distinct optical wavelength for transmission over the network. The transmitters ($XMTR_{01}$-$XMTR_N$) 12 optically communicate with an optical multiplexer 14 that combines the individual signals into a WDM signal. The WDM signal is optically communicated to transmission fiber links 16. In the preferred embodiment, the transmission fiber links 16 are non-zero dispersion shifted fiber (NZDSF) but may be implemented using other types of fiber such as dispersion-shifted fiber (DSF), or non dispersion shifted fiber (NDSF). An optical communication network may be a multi-span system including a number of spans 10 in optical communication. Additionally, the optical communication network may employ different architectures such as ring or mesh, rather than the linear architecture in FIG. 4.

Span 10 of the optical communication network may also include amplifiers 17 that are used to optical regenerate the signals. Amplifiers 17 typically are also used to overcome the loss associated with the dispersion compensating modules 18. Although the DCM modules 18 are depicted as being installed between two amplifiers, a DCM 18 may be installed at the end of a transmission fiber link 16 (i.e. at the input of the amplifier 17), or at the start of the transmission fiber link 16 (i.e. at the output of the amplifier 17) or any combination thereof.

Dispersion compensation modules 18 are in optical communication with transmission fiber links 16. The dispersion compensation modules 18 may include dispersion compensating fiber as described further herein. A de-multiplexer 20 in optical communication with the transmission fiber links 16 de-multiplexes the WDM signal and directs each optical carrier to an appropriate receiver ($RCVR_{01}$-$RCVR_N$) 22 designated for a particular wavelength. In one embodiment of the invention, one or more DCMs 18 utilize two types of DCF to compensate for residual dispersion curvature.

Figure 5:
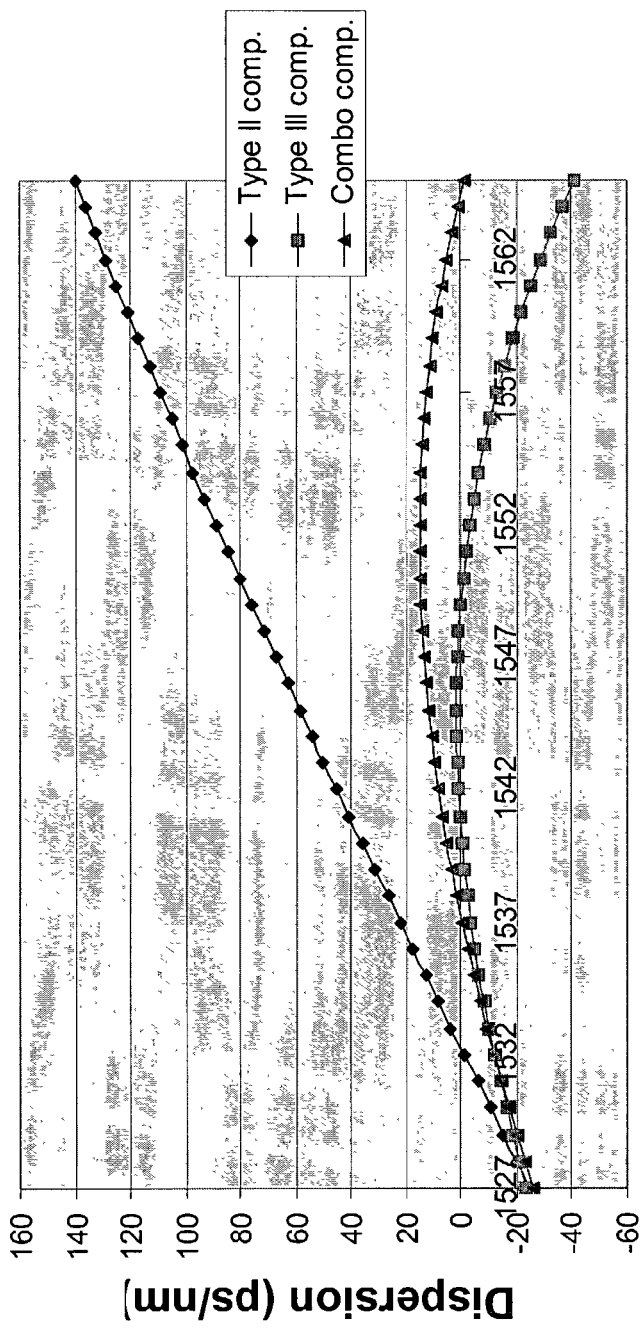
FIG. 5 is a graph of residual dispersion versus wavelength for multiple dispersion compensating fiber arrangements.

FIG. 5 is a graph of residual dispersion versus wavelength for multiple types of compensation including compensation using only a first type of DCF (shown as Type II DCF), compensation using only a second type of DCF (shown as Type III DCF) and compensation using a combination of Type II and Type III. As shown in FIG. 5, compensation with only Type II DCF results in residual dispersion that is substantially linear with respect to wavelength. Compensation with only Type III DCF results in residual dispersion having a curved, quadratic profile with respect to wavelength. Compensation with a combination of Type II and Type III DCF results in residual dispersion having a curved profiled with respect to wavelength, but having less curvature, or more linear, than compensation based on Type III DCF alone.

As shown in FIG. 5, the residual dispersion after compensation with each individual type of dispersion compensating fiber (Type II or Type III alone), exhibits opposite sign and slope at higher wavelengths. Hence a combination of the two types of DCF reduces the dispersion curvature, especially for higher wavelengths as depicted in FIG. 5.

The combination of the two types of DCF does not significantly effect residual dispersion, but does compensate residual dispersion curvature. Residual dispersion is normally defined as the maximum dispersion swing from the zero dispersion point after compensation. From FIG. 5 it is clear that the residual dispersion for the first type of DCF (e.g., Type II) is approximately 165 ps/nm (dispersion ranges from approximately −25 ps/nm to approximately +140 ps/nm over the wavelength range of interest). The residual dispersion for the second type of DCF (e.g., Type III) is approximately 42 ps/nm (dispersion ranges from approximately 2 ps/nm to approximately −40 ps/nm). The residual dispersion for the combination of the first type and second type of DCF is approximately 43 ps/nm (dispersion ranges from approximately −25 ps/nm to approximately +18 ps/nm). Thus, the use of multiple types of DCF may not significantly reduce the residual dispersion.

Residual dispersion curvature is the rate of change of the residual dispersion slope across the wavelength range of interest. In other words, the residual dispersion curvature is represented by the second derivative of the residual dispersion. As shown in FIG. 5, the use of a combination of a first type of DCF and a second type of DCF results in a lower residual dispersion curvature than using only the second type (e.g., Type III) of DCF.

Figure 1:
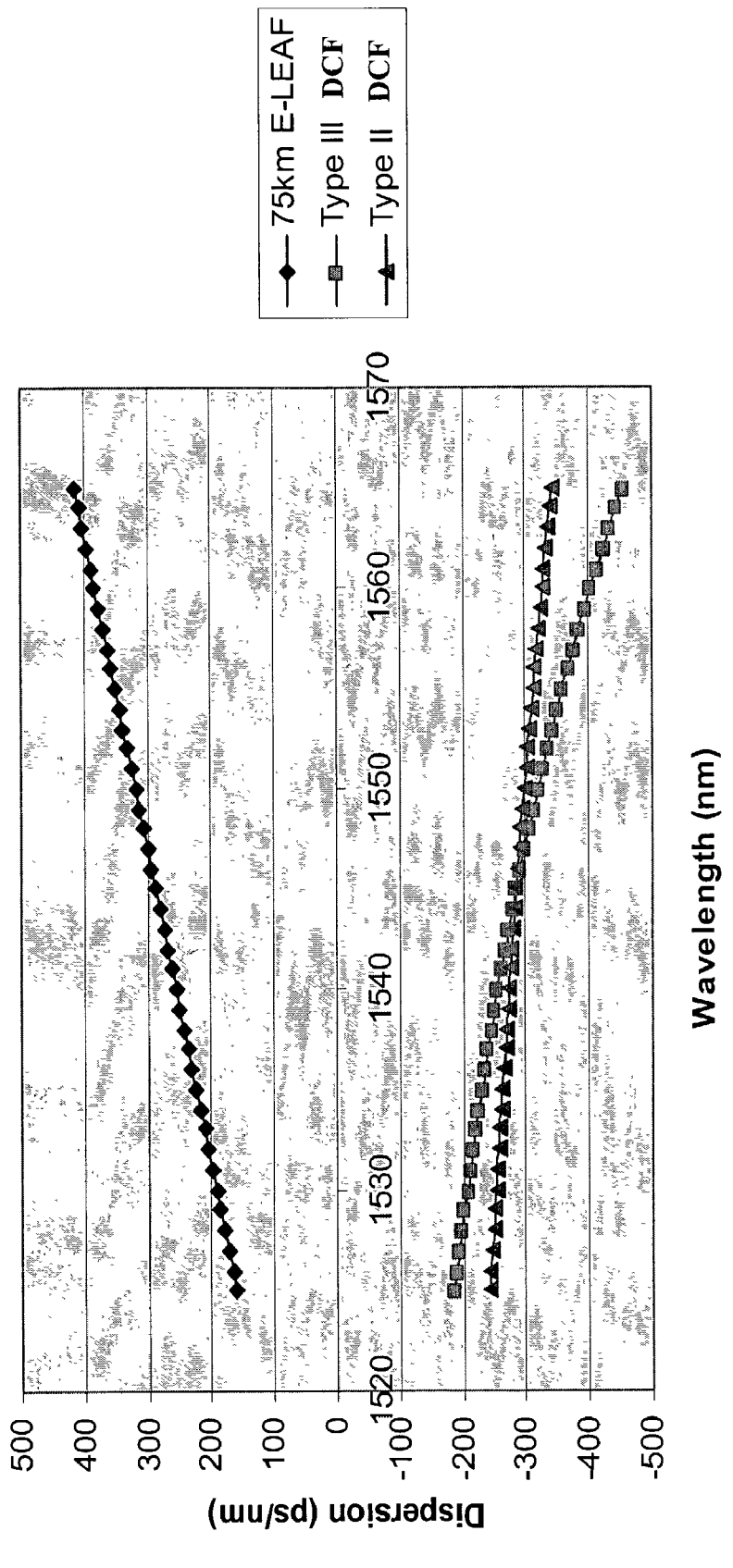
FIG. 1 is a graph of dispersion versus wavelength for a transmission fiber and two types of dispersion compensation fiber.
Figure 2:
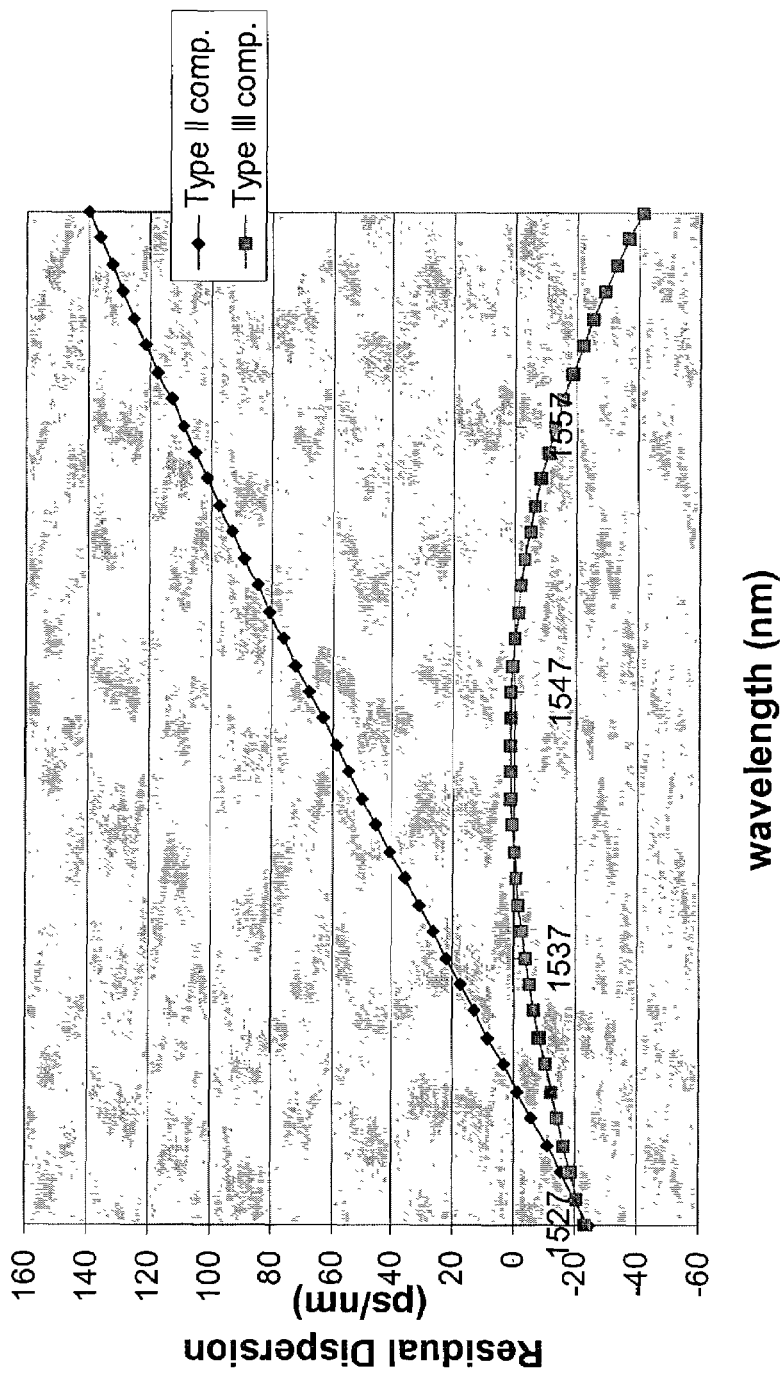
FIG. 2 is a graph of residual dispersion versus wavelength after compensation for two types of dispersion compensation fiber.
Figure 3:
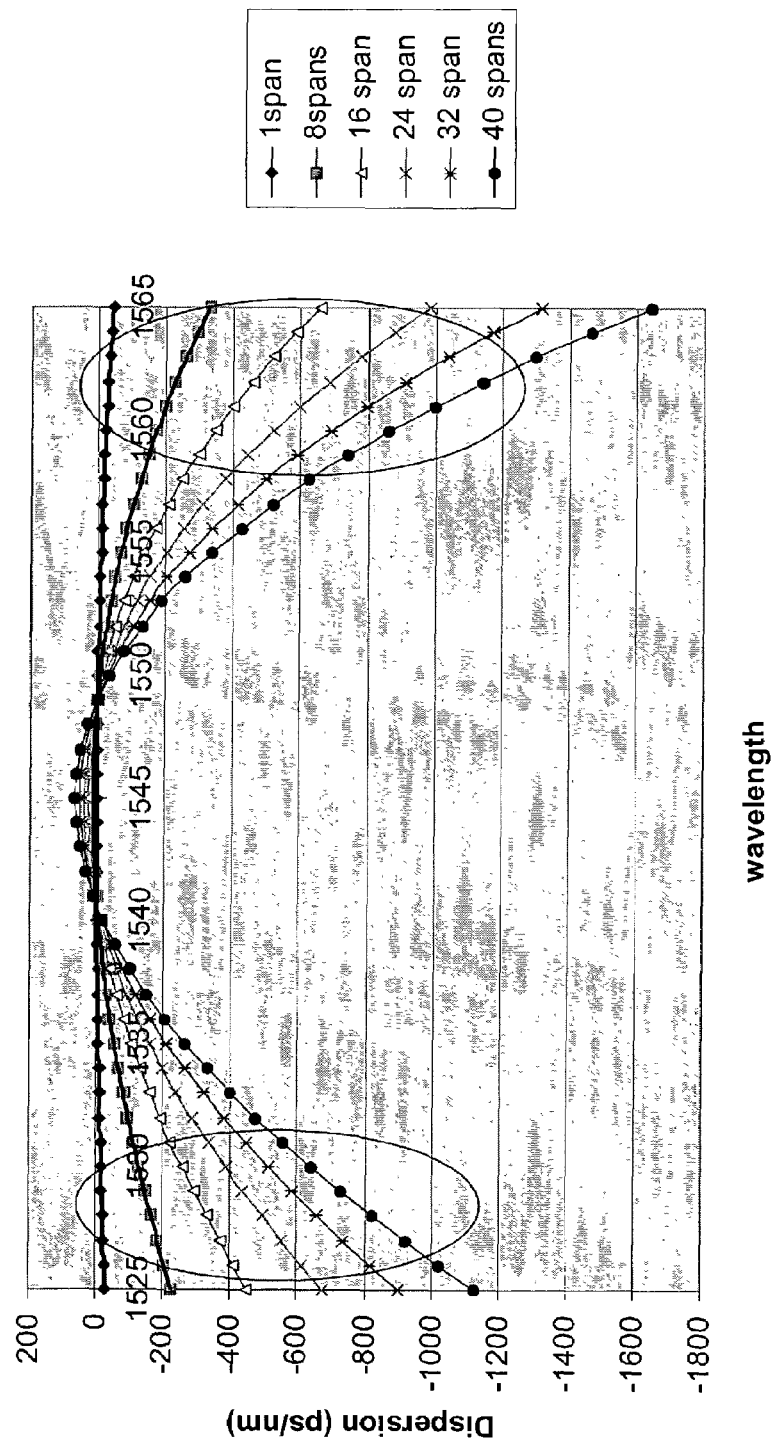
FIG. 3 is a graph of residual dispersion versus wavelength for systems having multiple spans.

Reduction of residual dispersion curvature reduces dispersion shaping explained with reference to FIG. 3. Dispersion shaping has a detrimental effect in compensating both linear dispersion and non-linear dispersion. In compensating linear dispersion, the dispersion shaping necessitates use of per channel dispersion compensators since the dispersion experienced by each channel varies greatly and cannot be compensated using one, lumped dispersion compensator common to all channels. Per channel compensators are expensive, have limited dispersion dynamic range, have amplitude and phase ripple, and are not as widely available as DCF.

Dispersion shaping also creates difficulties in compensating for non-linear dispersion such as cross-phase-modulation (XPM) and self-phase-modulation (SPM). To control XPM and SPM, the residual difference on a per link basis should be kept to a small value. Further, if SPM is used to slightly enhance system performance, dispersion maps dictate that the residual dispersion on a per link basis be kept at a finite value which is the same for all channels. If residual dispersion between neighboring channels changes at a very rapid rate (i.e. residual dispersion curvature is high), it will be difficult to reduce XPM as well as to optimize the dispersion maps to use SPM assistance equally well for all channels.

Figure 6:
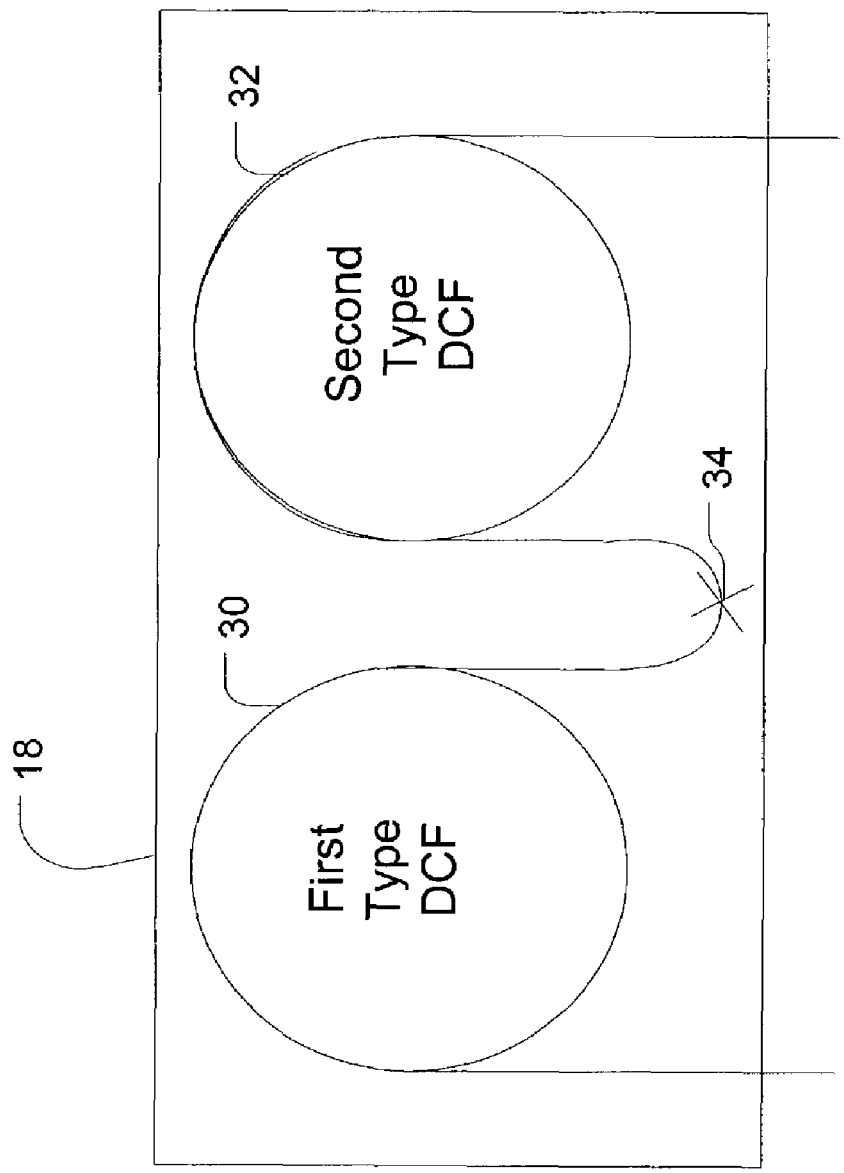
FIG. 6 depicts an exemplary dispersion compensation module.

For these reasons, reducing residual dispersion curvature is helpful. FIG. 6 depicts an exemplary dispersion compensation module 18 in one embodiment of the invention. The DCM 18 of FIG. 6 includes two types of DCF, namely a first spool 30 of a first type of DCF and a second spool 32 of a second type of DCF. The first type of DCF may be Type II DCF and has a first dispersion slope compensating magnitude. The two types of DCF are joined at a splice 34. It is understood that the two types of DCF may be wound on a common spool. Additionally, the spools may be fixed or removable. Alternatively, a number of different types of DCF may be contained in a housing and connected using connecting elements as disclosed in U.S. Pat. No. 6,259,845.

The amount of each type of DCF used in the DCM may be determined as follows. Assume that the dispersion as a function of wavelength (expressed as ps/nm) for a particular length of a transmission fiber link can be expressed as the following polynomial equation.

$$D_{1(trans\,fiber)} = a1*\lambda + b1*\lambda^2 + c1*\lambda^3 + K1$$

Since transmission fibers normally exhibit linear dispersion behavior, second order coefficient b1 and third order coefficient c1 would be zero. If we have two types of DCF, the dispersion associated with each type of DCF may be represented as $$D_{DCF2} = a2*\lambda + b2*\lambda^2 + c2*\lambda^3 + K2$$

$$D_{DCF3} = a3*\lambda + b3*\lambda^2 + c3*\lambda^3 + K3.$$

For simplicity, assume that both DCF2 and DCF3 have no third order terms, that is c2 and c3 are both zero. If we were to compensate with DCF2, we can always pick a length of DCF fiber such that the equation:

$$(a1*\lambda + K1) + (a2*\lambda + b2*\lambda^2 + K2) = 0$$

is satisfied at one wavelength. This implies that after compensation, the residual dispersion is zero at one wavelength. A perfect DCF2 would have second order coefficient b2=0 and first order coefficient a2=−a1, and K2=−K1 such that the residual dispersion is zero at all wavelengths. If DCF2 is such that K2=−K1 and a2=−0.6*a1, and b2 is negligible (e.g., b2 is approximately 0), the residual dispersion based on compensation using DCF2 alone would be substantially linear in shape but not well compensated. If DCF3 is such that K3=−K1, the first order coefficient a3=−0.9*a1 an-d the second order coefficient b3 is small but non-negligible, the residual dispersion based on compensation using DCF3 alone would be well compensated, but substantially quadratic given that the second order coefficient is non-negligible. Also, if a3 and b3 have the same sign, the first and second order terms will add constructively to reduce the linear part of the residual dispersion, but increase the quadratic part.

If DCF2 and DCF3 are mixed in a proportion (e.g., 20% DCF2 and 80% DCF3) then the effective first order coefficient, $a_{eff}$, is equal to 0.2*a2+0.8*a3 and the effective second order coefficient, $b_{eff}$, equal to 0.2*b2+0.8*b3. Using a2=0.6*a1 and a3=0.9*a1 as before results in $a_{eff}$ approximately equal to 0.84*a1 but $b_{eff}$ is 20% smaller than b3 (again, b2 is approximately 0). This minimally reduces the first order coefficient (from 0.9 to 0.84 or about 7%) while reducing the second order coefficient more substantially (by 0.20 or 20%). Since the second order coefficient gets multiplied by the second order term (i.e., $\lambda^2$) in the dispersion equation, a reduction of 20% in the second order coefficient causes a substantial decrease in the residual dispersion curvature.

The DCM shown in FIG. 6 corresponds to the example curves of FIG. 5 having 20% of the first type of DCF (e.g., Type II) and 80% of the second type of DCF (e.g., Type III). Note that the combination percentages will change depending on the dispersion profile of the transmission fiber, and the 20% and 80% numbers are for illustration only. The general procedure would be to solve the equations for the transmission fibers and the available DCFs simultaneously and pick a combination ratio that minimizes the residual dispersion curvature while also keeping the residual dispersion within certain bounds.

In the above examples, the third and higher order terms were neglected since they are usually very small even for DCF. Third order and higher order terms could be included if necessary. Also, the equations may be extended to include three types of DCF or standard single mode fibers. Thus, the invention is not limited to reducing the second order coefficient of a first type of DCF using a second type of DCF. Thus, the invention may be generalized as reducing the Nth order term, where N is greater than 1, of a residual dispersion profile by combining the first type of DCF with a second type of DCF to produce a residual dispersion profile having a reduced Nth order coefficient.

Figure 7:
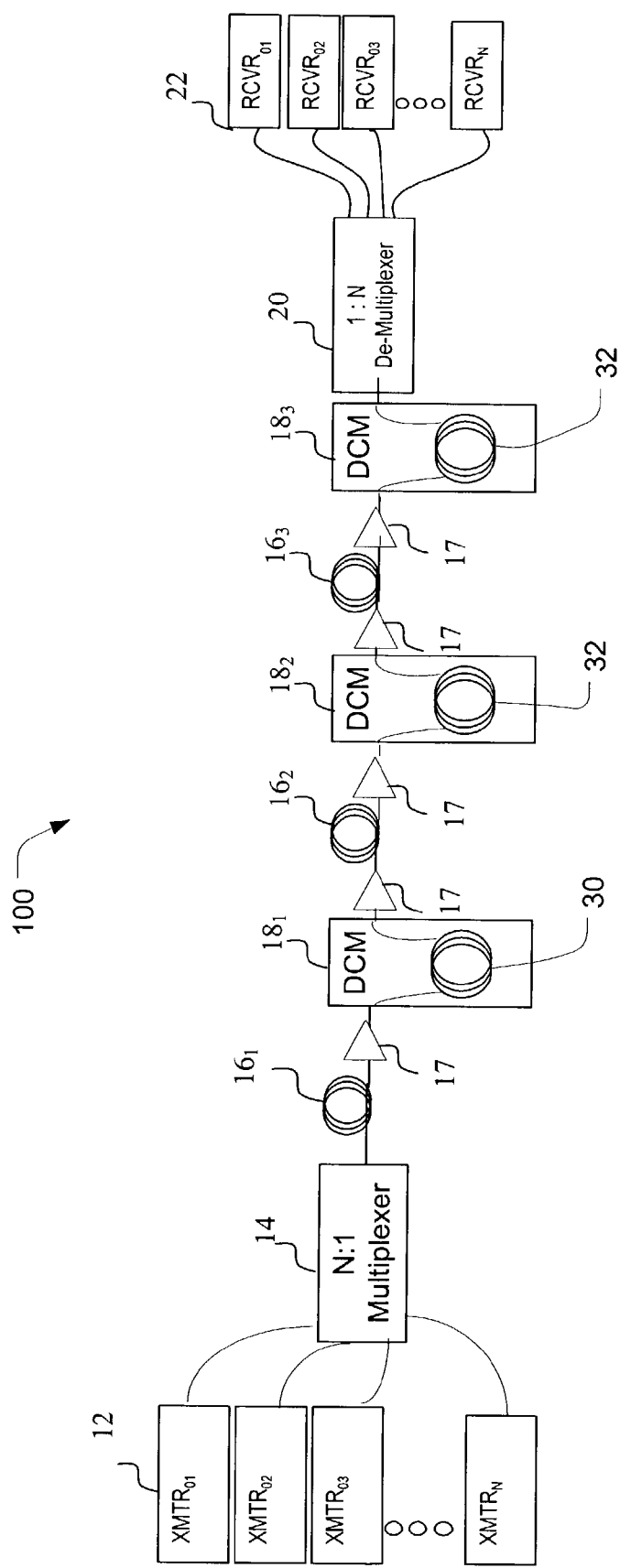
FIG. 7 is a block diagram of a span of an exemplary optical communication network.

FIG. 7 depicts an alternate embodiment in which a first type of DCF and a second type of DCF are employed at a system level, rather than at a module level. FIG. 7 is block diagram of a span 100 in an alternate embodiment of the invention. In FIG. 7, DCM $18_1$ includes the first type of DCF 30 and DCMs $18_2$ and $18_3$ include the second type of DCF 32. The number of DCM's can be adjusted so that as an average, across multiple links, the desired ratio of first type of DCF to second type of DCF is maintained. Alternatively, the lengths of first DCF 30 and second DCF 32 may be altered so that the desired combination of each type of DCF is achieved.

Figure 8:
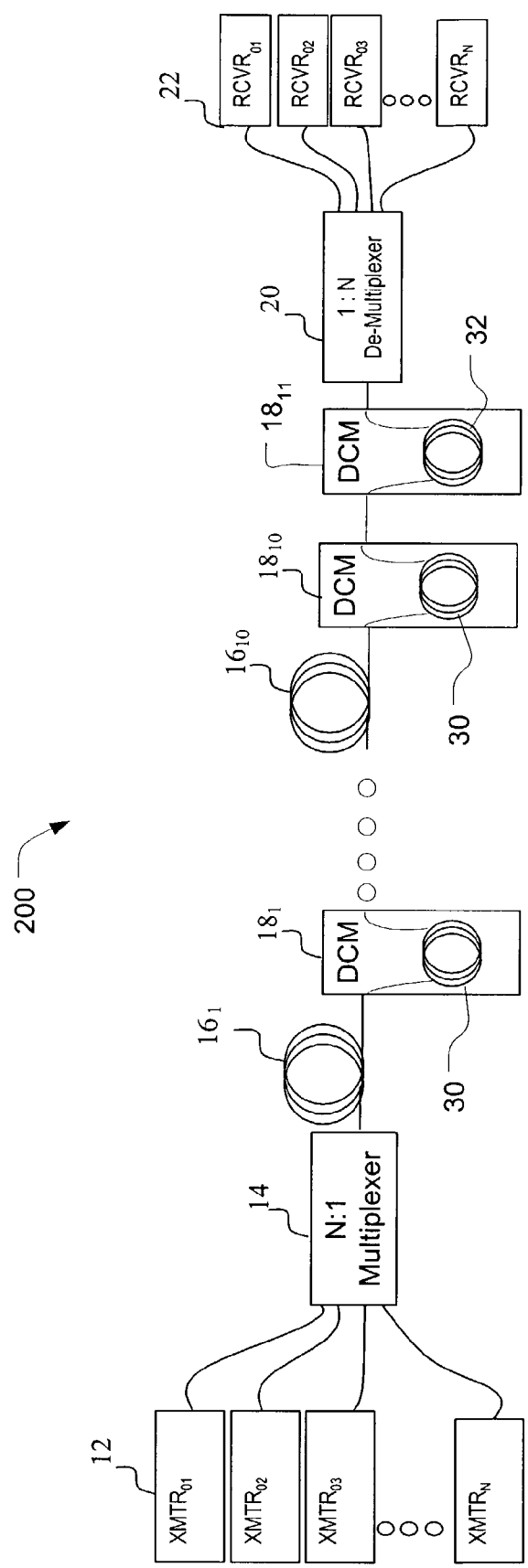
FIG. 8 is a block diagram of a span of an exemplary optical communication network.

In another embodiment, the second type of DCF is used to compensate for residual dispersion accumulated after multiple fiber links. FIG. 8 depicts an exemplary span 200 including ten fiber links 16 and ten DCMs $18_1$-$18_{10}$ having the first type of DCF 30. DCM $18_{11}$ serves as a correcting DCM that adjusts the residual dispersion experienced along the span 200 up to DCM $18_{11}$. DCM $18_{11}$ may be implemented using the second type of DCF 32 as shown in FIG. 8.

Figure 9:
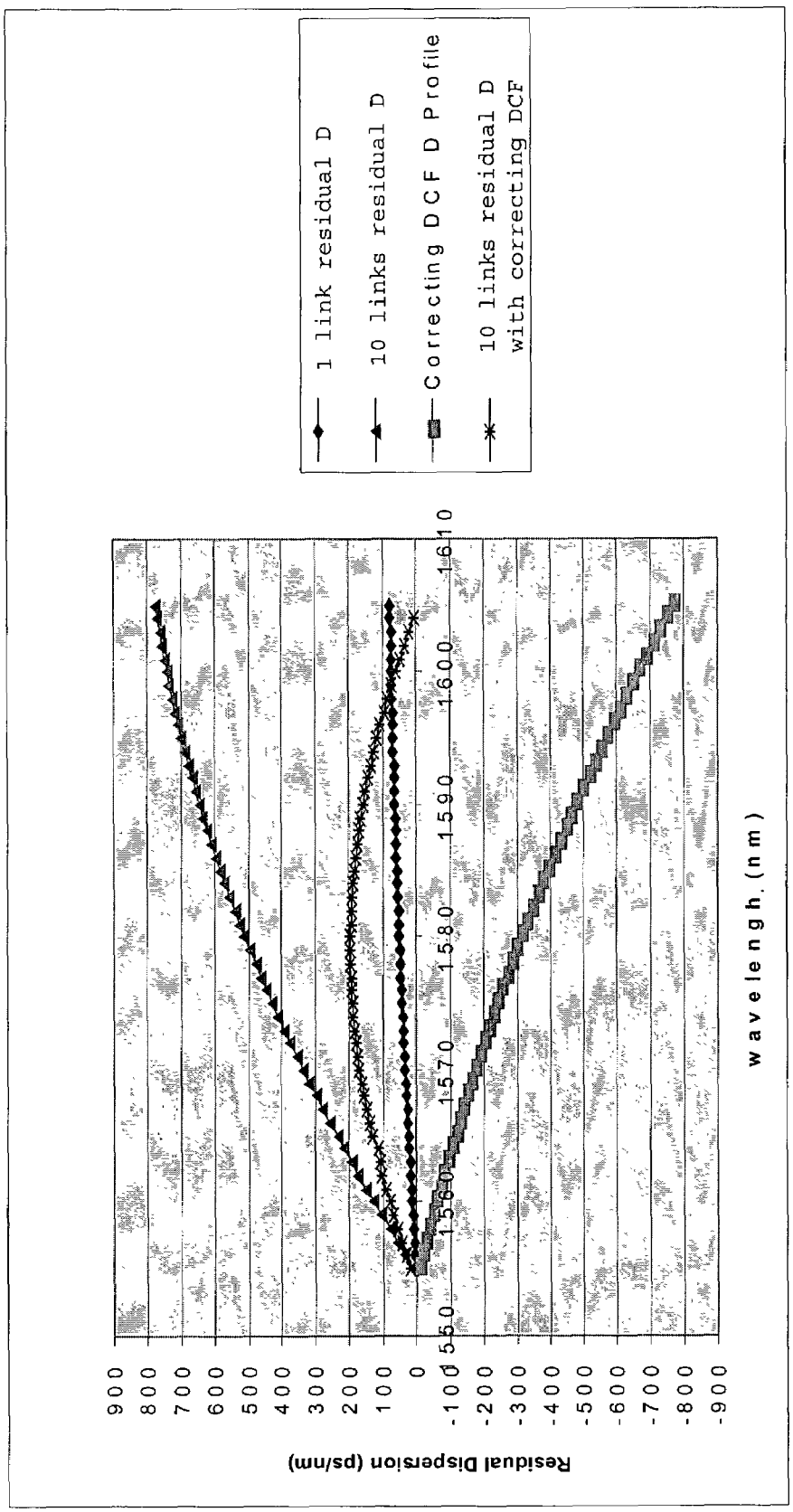
FIG. 9 is a graph of residual dispersion versus wavelength for multiple dispersion compensating components.

FIG. 9 is a graph showing residual dispersion for various components of the span 200. The plot of residual dispersion for one link depicts the residual dispersion after DCM $18_1$, including the first type of DCF, has compensated the WDM signals. The plot of residual dispersion after ten links illustrates the cumulative effect of residual dispersion upon a signal after passing DCM $18_{10}$ and indicates that the residual dispersion increases significantly after traversing multiple links. The correcting DCM $18_{11}$ utilizes the second type of DCF and has a compensation profile as shown in FIG. 9. The net residual dispersion after the correcting DCM $18_{11}$ is represented by the curve referenced as 10 links residual D (dispersion) with correcting DCF. The use of the correcting DCM $18_{11}$ reduces peak residual dispersion from 800 ps/nm to 200 ps/nm.

The correcting DCF may include multiple types of DCFs including a combination of first type, second type, third type, and even standard single mode fiber which has positive dispersion. The main goal of the correcting DCF module is to apply a spot correction to the accumulated dispersion slope, by synthesizing a dispersion profile that is substantially opposite to the accumulated residual dispersion. It is envisioned that multiple correcting DCM modules can be kept in inventory, each correcting for a certain magnitude and shape of residual dispersion. It is also possible to use alternate dispersion compensating elements such as all pass filters made with etalons to synthesize the required dispersion versus wavelength profile for use as correcting dispersion compensation module, instead of using a DCF-based correction solution.

In the example of FIG. 9, each link employs a DCM including the first type of DCF and the correcting DCM utilizes the second type of DCF. This arrangement may be reversed so that each link employs a DCM including the second type of DCF and the correcting DCM utilizes the first type of DCF.

Figure 10:
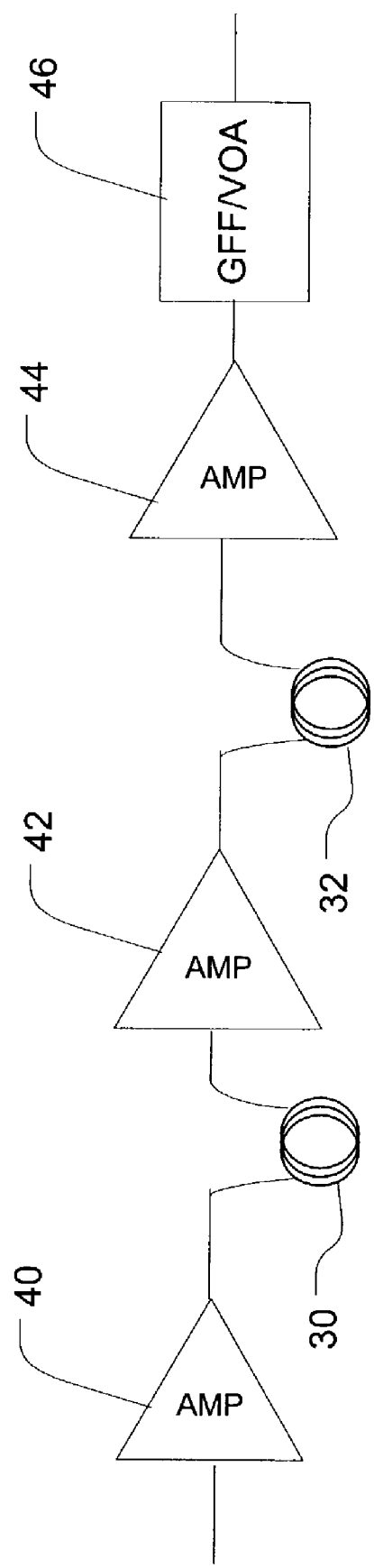
FIG. 10 is a block diagram of an exemplary dispersion compensation module.

In the embodiments described herein, the DCM's may be incorporated at amplifier sites as is conventional in optical communication networks. The use, however, of an additional correcting DCM, such as DCM $18_{11}$, introduces additional loss. FIG. 10 depicts an exemplary implementation for DCM $18_{10}$ and DCM $18_{11}$.

A first amplifier 40 receives the WDM signal and amplifies the WDM signal. From the first amplifier 40, the WDM signal is provided to the first type of DCF 30 which provides dispersion compensation of DCM $18_{10}$ shown in FIG. 9. A second amplifier 42 is used to pre-compensate for losses introduced by the second type of DCF 32. The second type of DCF 32 provides the correcting dispersion compensation of DCM $18_{11}$ shown in FIG. 9. An output stage amplifier 44 and gain flattening filter (GFF)/variable optical attenuator (VOA) serve as an output stage to set the WDM signal at a desired power across channels. A dynamic gain equalizer (DGE) may be included to flatten the gain profile. The optical amplifiers 40, 42 and 44 may be any known type of amplifier such as an erbium-doped fiber amplifiers (EDFA), an erbium-doped waveguide amplifiers (EDWA) or semiconductor optical amplifiers (SOA).

Figure 11:
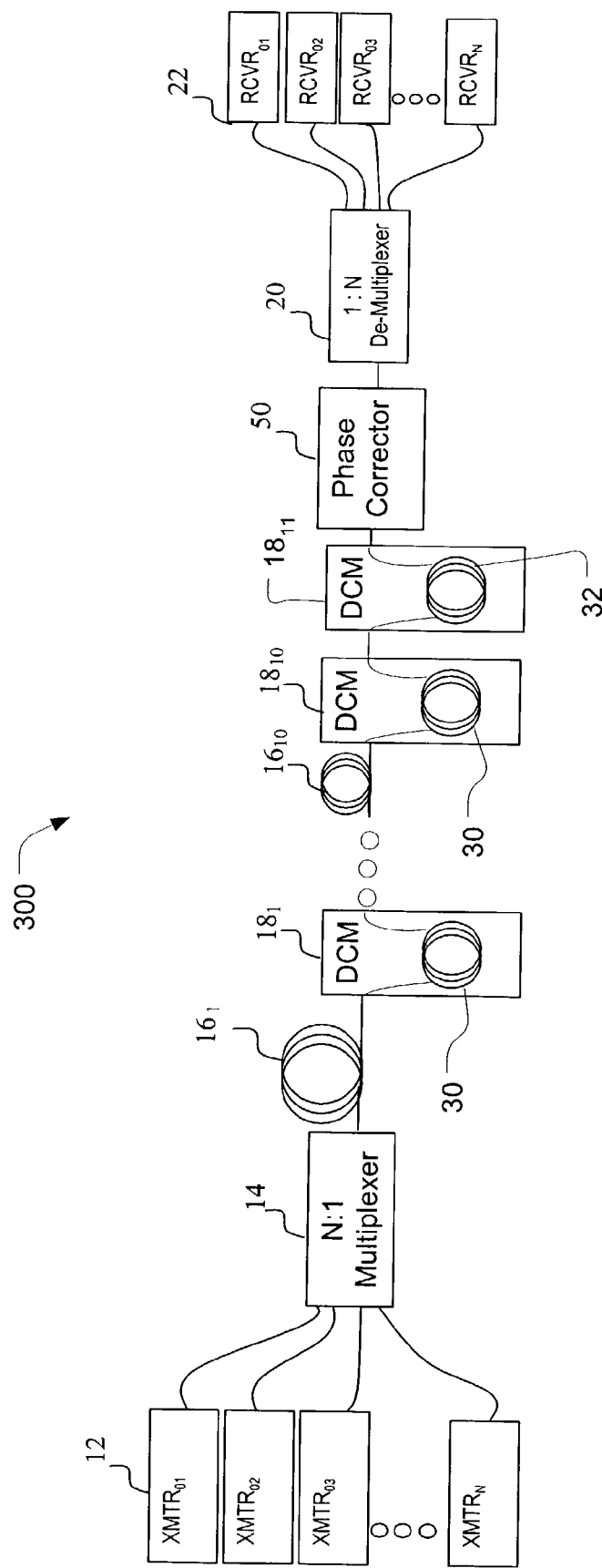
FIG. 11 is a block diagram of a span of an exemplary optical communication network.

In an alternate embodiment, a phase corrector is used to counteract residual dispersion curvature. FIG. 11 is a block diagram of a span 300 of an optical communication network including a phase corrector 50. Chromatic dispersion is proportional to the second derivative of the optical phase. The residual dispersion versus wavelength curve can be integrated twice and the phase variation with wavelength can be mathematically extracted out. The phase corrector 50 provides for adjustment of the phase variation such that residual dispersion is reduced.

Figure 12:
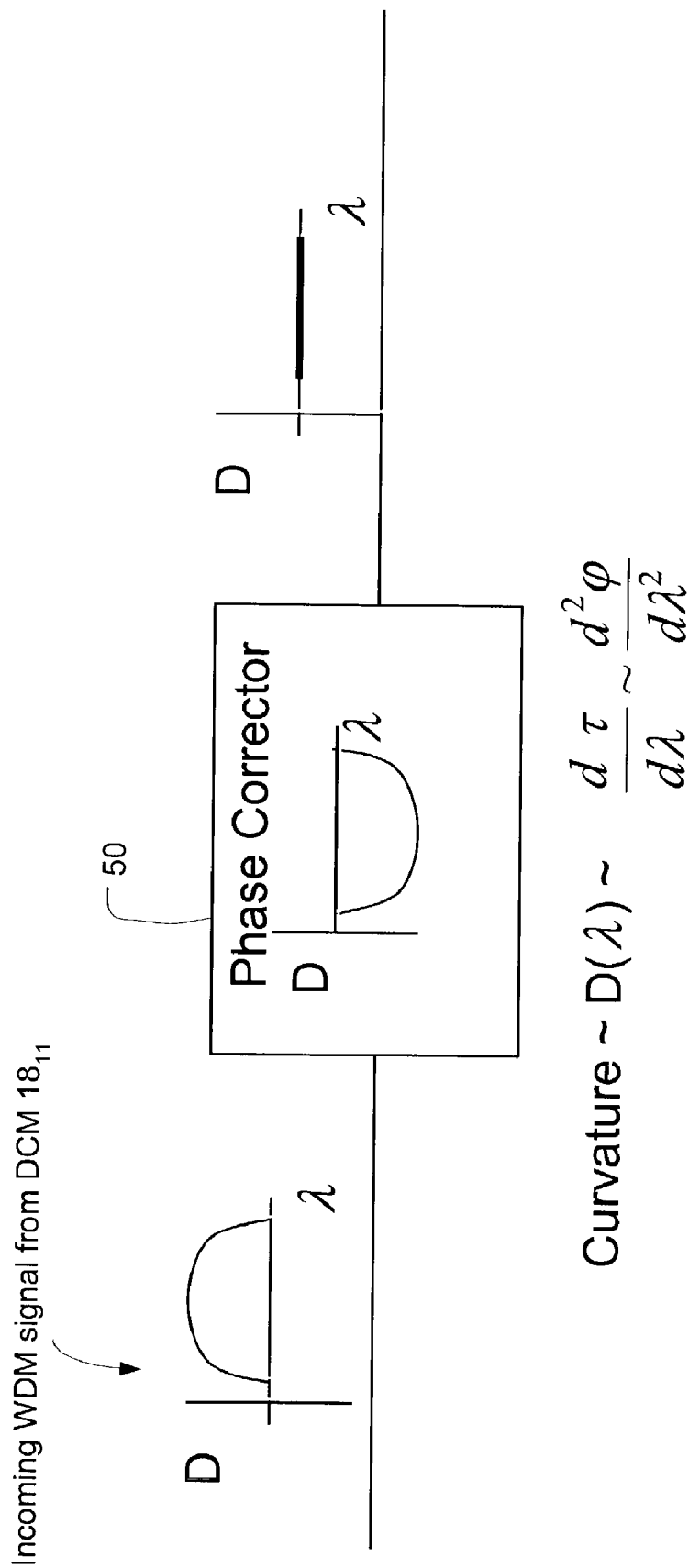
FIG. 12 depicts the residual dispersion of a WDM signal before and after processing by a phase corrector.

FIG. 12 illustrates the effect of the phase corrector 50. The WDM signal input to the phase corrector 50 from the DCM $18_{11}$ exhibits residual dispersion having a quadratic profile, similar to that show in FIG. 9. The phase corrector 50 has a transfer function as shown in FIG. 12 that adjusts the phase of the WDM signal such that the quadratic nature of the residual dispersion is substantially compensated.

Typically, prior to a WDM system installation, the dispersion versus wavelength for each transmission fiber link is measured with standard dispersion measuring instruments. The DCMs have known dispersion properties that are normally measured in the factory or can be known from specifications. Thus, when the system is installed, the installer normally has a-priori knowledge of the amount of residual dispersion as a function of wavelength at specific points along multiple spans. By performing the mathematics explained above, the phase corrector can be programmed to appropriately to cancel out the residual dispersion.

Alternately, if any in-situ dispersion measurement devices are used, the phase corrector can be dynamically adjusted to provide the appropriate correction based on the response of the dispersion measurement device. In such a situation, communication between the dispersion measurement device and the phase corrector could be direct, local, and through the WDM system software management system. Since dispersion or its curvature is fairly static temporally, fast communication is not required. Note that although the phase corrector is shown to have a quadratic dispersion profile to correct the incoming quadratic residual dispersion profile, in general it is not limited to correcting for quadratic profiles. The residual dispersion could have higher order components, and normal phase correctors will have gray level phase control. Hence the phase corrector can be used to correct for dispersion profiles that have linear, quadratic, tertiary, quartic, and higher order components or a mixture of them.

The phase corrector 50 may be implemented using known devices such as those used in short pulse laser systems to perform pulse shaping operations and in short pulse transmission systems to correct for third order dispersion. Such devices often include bulk gratings and liquid crystal modulators. The bulk grating diffracts the input spectrum and a lens collimates and focuses individual frequency components on the face of a liquid crystal modulator array. Each modulator pixel is controlled by a DC voltage and the phase change across the pixel is proportional to the magnitude of the applied voltage. By controlling the voltage to the different pixels, the phase change across the different frequency components can be tailored to fit a desired profile. The liquid crystals have very low loss and only the phase of the different frequency components changes as the light travels through the pixels. Fixed phase masks deposited on a suitable substrate (e.g. glass) can also be used instead of liquid crystal modulator arrays if dynamic programming of the liquid crystals, and the therefore the phase, is not required. At the output of the liquid crystal array, a lens focuses the beam back onto an output grating which then collects the light and diffracts it to a tight spot which can be coupled into an output optical fiber.

Alternately, a mirror could be positioned at the output face of the liquid crystal array and the light can be made to re-trace its path. If the mirror is slightly tilted, the light on its return path will be spatially positioned slightly away from the input, thus separating the input and output of this phase corrector.

Alternately, other approaches such as all pass filters using ring resonators or all pass filters using etalons can be used for providing fixed or tunable phase corrections. Also, these phase correctors can be cascaded if more residual dispersion curvature correction is desired, and the resulting increased insertion loss compensated by adding an amplifier stage.

In the embodiment shown in FIG. 11, the phase corrector 50 is used in conjunction with the first type of DCF 30 and the second type of DCF 32. The phase corrector may be used without requiring two types of DCF and simply be used to compensate residual dispersion curvature for a single type of DCF.

Alternatively, the phase corrector 50 may be used alone, without any DCF in the span. Such an implementation may be used where the transmission fiber has little dispersion such as dispersion shifted fiber or dispersion managed fiber (standard transmission fiber with DCF spliced in as part of the transmission path). In these cases, the phase corrector 50 can be used independently without the need for separate DCM's.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An optical communication network comprising:
   a plurality of transmission fiber links in optical communication with each other;
   a plurality of amplifiers in optical communication with said transmission fiber links;
   a first type of dispersion compensating fiber in optical communication with said transmission fiber links, said first type of dispersion compensating fiber providing a first residual dispersion having a residual dispersion versus wavelength profile having an Nth order term and a Nth order coefficient, N being greater than 1;
   a second type of dispersion compensating fiber in optical communication with said transmission fiber links and said first type of dispersion compensating fiber;
   a combination of said first type of dispersion compensating fiber and said second type of dispersion compensating fiber providing an effective residual dispersion having an effective residual dispersion versus wavelength profile with an effective Nth order coefficient that is less than the Nth order coefficient; wherein:
   said first type of dispersion compensating fiber has a dispersion characteristic represented in part as:

$D_{DCF2} = a2*\lambda + b2*\lambda^N$, and said second type of dispersion compensating fiber has a dispersion characteristic 5 represented in part as:

$D_{DCF3} = a3*\lambda + b3*\lambda^N$, said effective Nth order coefficient being equal to:

$\alpha b2 + (1-\alpha) b3$, where $\alpha$ represents a proportion of said first type of dispersion compensating fiber to a total amount of said first type of dispersion compensating fiber and said second type of dispersion compensating fiber.

2. The optical communication network of claim 1 wherein:
   N is 2.

3. The optical communication network of claim 1 further wherein at least one of said first type of dispersion compensating fiber and said second type of dispersion compensating fiber is a capable of carrying a wavelength division multiplex signal.

4. The optical communication network of claim 1 further comprising:
   a plurality of dispersion compensation modules in optical communication with said transmission fiber links;
   each of said dispersion compensation modules including said first type of dispersion compensating fiber and said second type of dispersion compensating fiber; each of said dispersion compensation modules being associated with one of said transmission fiber links to compensate dispersion in said associated transmission fiber link.

5. The optical communication network of claim 1 further comprising:
   a phase corrector in optical communication with said transmission fiber links, said first type of dispersion compensating fiber and said second type of dispersion compensating fiber;
   wherein said transmission fiber links carry a wavelength division multiplexed signal including a plurality of wavelengths;
   said phase corrector compensating a portion of the effective residual dispersion by adjusting the phase of at least one of said wavelengths.

6. The optical communication network of claim 1 wherein:
   wherein said transmission fiber links are configured to carry a wavelength division multiplexed signal including a plurality of wavelengths, said first type of dispersion compensating fiber being configured to provide dispersion compensation for said wavelengths simultaneously, said second type of dispersion compensating fiber configured to provide dispersion compensation for said wavelengths simultaneously.

7. The optical communication network of claim 6, wherein said transmission fiber links are configured to carry a plurality of multiplexed wavelengths simultaneously.

8. A method of compensating dispersion in an optical communication network, the method comprising:
   compensating using a first type of dispersion compensating fiber, said first type of dispersion compensating fiber providing a first residual dispersion having a residual dispersion profile having an Nth order term and a Nth order coefficient, N being greater than 1; and,
   compensating using a second type of dispersion compensating fiber in optical communication with the first type of dispersion compensating fiber;
   a combination of said first type of dispersion compensating fiber and said second type of dispersion compensating fiber providing an effective residual dispersion having an effective residual dispersion profile with an effective Nth order coefficient that is less than the Nth order coefficient; wherein:
   the first type of dispersion compensating fiber has a dispersion characteristic represented in part as:

$D_{DCF2} = a2*\lambda + b2*\lambda^N$, said second type of dispersion compensating fiber has a dispersion characteristic 5 represented in part as:

$D_{DCF3} = a3*\lambda + b3*\lambda^N$, the effective Nth order coefficient being equal to:

$\alpha b2 + (1-\alpha) b3$, where $\alpha$ represents a proportion of the first type of dispersion compensating fiber to a total amount of the first type of dispersion compensating fiber and the second type of dispersion compensating fiber.

9. The method of claim 8 wherein:
   N is 2.

10. The method of claim 8 wherein:

the optical communication network carries a wavelength division multiplexed signal including a plurality of wavelengths, said compensating using the first type of dispersion compensating fiber providing dispersion compensation for said wavelengths simultaneously, said compensating using the second type of dispersion compensating fiber providing dispersion compensation for said wavelengths simultaneously.

11. The method of claim 8 wherein:

the optical communication network includes a plurality of transmission fiber links;

said compensating using the first type of dispersion compensating fiber and said compensating using the second type of dispersion compensating fiber being performed for each transmission fiber link.

12. The method of claim 8 further comprising:

performing a phase correction to compensate the effective residual dispersion by adjusting a phase of at least one wavelength carried by the optical communication network.

13. A dispersion compensation module comprising:

a first type of dispersion compensating fiber, said first type of dispersion compensating fiber providing a first residual dispersion having a residual dispersion profile having an Nth order term and a Nth order coefficient, N being greater than 1; and, a second type of dispersion compensating fiber in optical communication with the first type of dispersion compensating fiber;

a combination of said first type of dispersion compensating fiber and said second type of dispersion compensating fiber providing an effective residual dispersion having an effective residual dispersion profile with an effective Nth order coefficient that is less than the Nth order coefficient; wherein said first type of dispersion compensating fiber has a dispersion characteristic represented in part as:

$$D_{DCF2}=a2*\lambda+b2=a^N,$$

said first type of dispersion compensating fiber has a dispersion characteristic represented in part as:

$$D_{DCF3}=a3*\lambda+b3*\lambda^N,$$

said effective Nth order coefficient being equal to:

$$\alpha b2+(1-\alpha)b3,$$

where $\alpha$ represents a proportion of said first type of dispersion compensating fiber to a total amount of said first type of dispersion compensating fiber and said second type of dispersion compensating fiber.

14. The optical communication network of claim 13, wherein:

said first and second types of dispersion compensating fibers are configured to carry a plurality of multiplexed wavelengths, said first type of dispersion compensating fiber being configured to providing dispersion compensation for said multiplexed wavelengths simultaneously, said second type of dispersion compensating fiber providing dispersion compensation for said multiplexed wavelengths simultaneously.

15. The dispersion compensation module of claim 13 further comprising:

a first amplifier positioned prior to said first type of dispersion compensating fiber;

a second amplifier positioned between said first type of dispersion compensating fiber and said second type of dispersion compensating fiber; and, a third amplifier positioned after said second type of dispersion compensating fiber.

16. The dispersion compensation module of claim 15 further comprising:

a gain flattening filter positioned after said third amplifier.

17. The dispersion compensation module of claim 15 further comprising:

a variable optical attenuator positioned after said third amplifier.

* * * * *

UNITED STATES PATENT AND TRADEMARK OFFICE
CERTIFICATE OF CORRECTION

| | | |
|---|---|---|
| PATENT NO. | : 7,292,790 B1 | Page 1 of 1 |
| APPLICATION NO. | : 10/216113 | |
| DATED | : November 6, 2007 | |
| INVENTOR(S) | : Harshad P. Sardesai | |

It is certified that error appears in the above-identified patent and that said Letters Patent is hereby corrected as shown below:

Detailed Description of Invention, Column 5, line 62, "an-d" should be -- and --.

Claim 13, line 1, "first" should be -- second --.

Claim 13, line 2, "characteristic represented" should be -- characteristic 5 represented --.

Signed and Sealed this

Twenty-fifth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,292,790 B1  Page 1 of 1
APPLICATION NO. : 10/216113
DATED : November 6, 2007
INVENTOR(S) : Harshad P. Sardesai It is certified that error appears in the above-identified patent and that said Letters Patent is hereby corrected as shown below:

Detailed Description of Invention, Column 5, line 62, "an-d" should be -- and --.

Column 11, Claim 13, line 22, "first" should be -- second --.

Column 11, Claim 13, line 23, "characteristic represented" should be -- characteristic 5 represented --.

This certificate supersedes the Certificate of Correction issued November 25, 2008.

Signed and Sealed this

Twenty-third Day of December, 2008

JON W. DUDAS
*Director of the United States Patent and Trademark Office*